United States Patent [19]

Campbell et al.

[11] Patent Number: 5,698,254
[45] Date of Patent: Dec. 16, 1997

[54] COCONUT CREAM ALTERNATIVE AND METHOD OF PREPARING SAME

[75] Inventors: Iain James Campbell, Northampton, United Kingdom; Evelyn Mary Moriarty, Rotterdam, Netherlands; Yenni Sibuea, Jakarta, Indonesia

[73] Assignee: Unilever Patent Holdings B.V., Rotterdam, Netherlands

[21] Appl. No.: 491,992

[22] PCT Filed: Jan. 4, 1994

[86] PCT No.: PCT/EP94/00017

§ 371 Date: Nov. 22, 1995

§ 102(e) Date: Nov. 22, 1995

[87] PCT Pub. No.: WO94/15477

PCT Pub. Date: Jul. 21, 1994

[30] Foreign Application Priority Data

Jan. 18, 1993 [EP] European Pat. Off. ............. 93300308

[51] Int. Cl.$^6$ ..................................................... A23L 3/00

[52] U.S. Cl. .......................... 426/617; 426/519; 426/521; 426/585; 426/602; 426/803

[58] Field of Search .................................. 426/617, 585, 426/519, 521, 602, 803

[56] References Cited

U.S. PATENT DOCUMENTS

| 4,748,028 | 5/1988 | McKenna et al. | 426/602 |
| 5,190,781 | 3/1993 | Van Heteren et al. | 426/602 |
| 5,290,581 | 3/1994 | Campbell et al. | 426/602 |

*Primary Examiner*—Helen Pratt
*Attorney, Agent, or Firm*—Cushman Darby & Cushman IP Group Pillsbury Madison & Sutro LLP

[57] ABSTRACT

The invention concerns coconut cream alternatives, being water continuous fat emulsions, comprising: 0.1–30 wt. % vegetable fat, 0.1–5 wt. % protein compound, 0–2 wt. % emulsifier, 0–10 wt % sweetener, 0.01–5 wt. % thickener, 0.01–2 wt. % flavor, 0–1,500 ppm. multivalent cation, upon heating above 70° C. flocculation of at least the protein compound occurs.

22 Claims, No Drawings

COCONUT CREAM ALTERNATIVE AND METHOD OF PREPARING SAME

Coconut cream, i.e. the emulsion obtained by extraction of comminuted coconut kernel (with or without addition of water), is a well-known product in tropical areas like Indonesia, Thailand, Philippines etc. So far, these creams were mainly hand-made from fresh mature coconuts. This technique, however, is time-consuming and inefficient while the product obtained had to be used immediately and, as it cannot be stored properly, rapid deterioration occurs upon storage at ambient temperature.

BACKGROUND OF THE INVENTION

In the past, attempts were made to prepare canned, pasteurized or sterilized coconut creams. Although such treatments improved the shelf life, the temperatures applied in such treatments resulted in an unacceptable off flavor and unacceptable phase separation of the emulsion making the products less acceptable to the consumer.

We have therefore conducted a study to see whether it is possible to prepare a coconut cream alternative that could be sterilized so that the sterilized products would have a long shelf life while the properties of the sterilized composition would still be similar to those of fresh coconut cream.

SUMMARY OF THE INVENTION

We have found compositions that could stand a UHT treatment (=sterilization) while their emulsion properties, such as emulsion stability at ambient temperature and viscosity, but also their color and flavor are similar to those of fresh coconut cream.

Therefore, our invention is concerned with sterilized, water-continuous fat emulsions comprising
1–30 wt. %, preferably 1–15 wt % of a vegetable fat;
0.1–5 wt. % of a protein compound;
0–2 wt. % of an emulsifier composition;
0–10 wt. % of a sweetener, in particular a carbohydrate;
0.01–5 wt. % of a thickener composition;
0.01–2 wt. % of a flavor composition;
0–1500 ppm. of a multivalent metal, which composition, upon heating above 70° C., shows flocculation of at least the protein component. The flocculation was measured, according the following technique;

The basis of the technique is to heat a diluted (15%) sample in either de-ionized, tap or hardened water (with $Ca^{2+}$) at 85° C. The oil droplets flocculate and rise to the top of the sample. The lower layer is then separated and the % flocculation is then given by the expression:

$$\% \text{ flocculation} = 1 - \left( \frac{\phi^*}{\phi} \right) \times 100$$

where $\phi^*$ is the % cream remaining in the separated lower layer of the heated sample, and $\phi$ is the % cream in the separated lower layer of an unheated sample (control).

The % cream remaining in the separated lower layer is measured by measuring the turbidity of a 0.25% dilution of sample in water and comparing it with a calibration curve of % cream (diluted in water) vs turbidity. The precise details of the test regime are:

1. Production of calibration curve
a) An unheated cream sample is diluted in de-ionized water to the following dilution: 0.005%, 0.025%, 0.1% 0.2% 0.25% and 0.3%.
b) The turbidity of each sample is determined using a Minolta Chroma Meter (type CT 210).
c) A calibration plot of % cream vs turbidity (or reflectance) is constructed.
d) The % cream in a sample of unknown value is determined by measuring the turbidity and reading off the % cream from the calibration plot.
e) A new calibration plot must be constructed for each unique cream composition.

2. Determination of % flocculation
a) Measure 170 mls of de-ionized water, tap water or hardened water (containing $Ca^{2+}$) into a beaker.
b) Measure 30 mls of the cream sample and add to the beaker.
c) Heat the sample for 30 minutes at 85° C.
d) Transfer the beaker contents to a separating funnel and leave to cool.
e) When the sample is cool drain off a sample of the lower layer excluding the upper flocculated layer.
f) Filter the lower layer obtained under vacuum through a filter paper (Whatman 541) into a clean flask.
g) Dilute the filtered sample by adding 1.67 ml to a clean volumetric flask and making up to 100 ml with de-ionized water (total sample dilution is now 0.25).
h) Measure the turbidity of the sample and convert to % cream using the calibration curve.
i) Calculate the % flocculation using the following expression:

$$\% \text{ flocculation} = 1 - \left( \frac{\% \text{ cream}}{0.25} \right) \times 100$$

As fresh coconut cream, upon heating, displays rapid development of a certain amount of floculation owing to aggregation and flocculation of the protein component of the cream, it was important that a similar flocculation should occur with the coconut cream alternatives.

DETAILED DESCRIPTION OF THE INVENTION

Therefore, it is important to apply protein compounds that flocculate upon heating above 70° C. Although many vegetable and animal proteins display such flocculation, only those proteins could be used that did not result in an unacceptable off taste of the product upon sterilization.

Suitable proteins are therefore selected from the group consisting of whey protein, coconut protein, soy protein, pea protein, sunflower protein, cottonseed protein or other vegetable storage proteins and, caseinate, or mixtures thereof. Very good results were obtained by applying a mixture of at least two protein compounds of above group. It was further found, that upon application of caseinate as protein the best results were obtained, when the emulsion simultaneously comprised at least 10 ppm, preferably at least 50 ppm of a multi-valent metal.

The nature of the fat component is not very critical. In fact, any natural or synthetic fat component derived from vegetable sources can be applied. The fats can therefore be selected from hardened fats, high in SAFA (saturated fatty acid) or unhardened vegetable fats, high in PUFA (partially unsaturated fatty acid), but also fractions thereof or mixtures of these fats can be applied. In particular, suitable fats are therefore selected from the group consisting of coconut oil, hardened coconut oil, fractions of hardened coconut oil, palmkernel fat, hardened palmkernel fat, fractions of hardened palmkernel fat, palm oil, hardened palm oil, fractions of palm oil or hardened palm oil, soybean oil, sunflower oil, safflower oil, maize oil, rapeseed oil.

If a healthier cream is required, liquid oils high in PUFA content, either per se or admixed with hard fats, should be applied.

In principle, any emulsifier can also be comprised in our compositions. Examples of such emulsifiers are selected from the group consisting of monoglycerides, lactylates, polyglycerol esters, lecithin, diacetyl tartaric esters.

A minimum amount of thickener is required in order to achieve an acceptable texture. Thickeners that can be used can be chosen from the group consisting of: a carrageenan, locust bean gum, guar gum, starches, modified starches, pectins, gelatins, xanthan gum alginate, agar, gum acasia, gum tracaganth, gellan gum or mixtures thereof. It was, however, found that the best results were obtained when the thickener applied was modified starch.

Sweeteners, although not absolutely necessary, are normally present in order to achieve a sweet taste and often also because of their water-binding abilities. The sweetener can be selected from the group consisting of carbohydrates, such as sucrose, glucose, fructose, syrups of glucose or fructose, maltodextrins or mixtures thereof, while also high-intensity sweeteners can be present. In particular, a mixture of sucrose and a glucose syrup having a weight ratio of 1:2 to 2:1 yields very good results.

In order to imitate the desired flocculation of the proteins, we found that the presence of some, preferably 10–1500 ppm, in particular 50–1000 ppm of a polyvalent cation, in particular $Ca^{2+}$, was advantageous.

As coconut cream is traditionally diluted with water prior to its being used, the required amount of multivalent cation, in particular $Ca^{2+}$, could be realized by the addition of hard (at least not softened) water at the dilution, in which case the coconut cream alternative could be free of multivalent cation. However, very often, water in areas where coconut cream is applied, is very soft. In these cases, the required flocculation only occurs when the coconut cream alternative contains the multivalent cation per se.

From EP 509 579 it is known that incorporation of $Ca^{2+}$ in water-continuous emulsions can improve the whipping performance of the emulsions. In this reference it is disclosed that NDC's based on liquid oils are too stable to be whipped. Incorporation of $Ca^{2+}$ in the creams makes them less stable and therefore whippable. Nothing is disclosed about coconut cream (alternatives) that are not whippable. From EP 113 536 edible foams are known that are based on fats, at least partly consisting of butter fat. As the compositions must be foamable they must have a good whipping performance. The products are not sterilized, but only pasteurized.

The pH of our sterilized coconut cream alternatives is in general about neutral, preferably 6.5–7.5. The amount of $Ca^{2+}$ that is required will depend on this pH of the emulsion. However in our pH-range of 6.5–7.5 the amounts mentioned above will suffice.

Stable emulsions having excellent shelf lives were in particular obtained when the droplet size of the fat droplets was less than 5 μm.

If the protein compound is coconut protein, we prefer that the droplet size of the fat droplets is less than 1 μm.

In fact, the emulsions obtained are so stable, that they cannot be whipped, when applying a house-hold Kenwood whipping machine.

After processing of our ingredients (see later), a coconut cream alternative results in which the Kinematic viscosity of the emulsion at 30° C. ($=\eta_{30}$) ranges from 1–500 c.s., preferably from 2–200 c.s. and most preferably from 5–100 c.s. The viscosity was measured using a reverse flow capillary viscometer according to the method BS 188. The units are Kinematic viscosity in centi-stoken (=c.s.).

The sterilized coconut cream alternatives according to the invention are stable against coalescence at 35° C. for at least 3 months, preferably for at least 6 months.

The emulsions display a percentage of flocculation at heating for 50 min. at 85° C. of at least 50%, preferably of at least 75%.

Coconut creams are conventionally applied in the preparation of traditional meals, e.g. as a cooking additive. Therefore, food products at least partly consisting of the sterilized, water-continuous fat emulsions according to the invention are also part of this invention. For this purpose spices are often incorporated in the creams according to the invention.

Another part of the invention is the process of preparing our emulsions. Therefore, a process for the preparation of the water-continuous fat emulsions according to the invention wherein a premix is made of all components except the metal component at 50°–80° C.;

the premix is optionally heated to a temperature above 80° C.;

the heated premix is subjected to a direct or indirect UHT treatment at 130°–150° C. for 1–30 seconds;

the sterilized mixture is cooled to 50°–75° C.;

the cooled, sterilized mixture is homogenized at a pressure of 10–250 bar, preferably 50–250 bar;

the homogenized mixture is cooled to 5°–35° C.;

the cooled mixture is packed aseptically, preferably at 5°–35° C., a sterilized multivalent metal solution being added to the mixture in the above-mentioned process in a step after the sterilization step, is also part of the invention.

It should be noted that the flavor does not need to be part of the premix. It can be added any moment. It is even preferred to add it after the sterilization.

In this process, it is essential that the multivalent metal solution be added after the sterilization step. Although earlier addition is possible, this will lead to fouling of the UHT equipment.

Addition of the multivalent metal solution can occur in the following steps 1) just before homogenization;
2) just after homogenization;
3) after the final cooling step to 5°–35° C. but before packaging.

It is very convenient to use a buffer tank wherein part of the cooled, sterilized emulsion is stored prior to packaging.

EXAMPLES

A range of products were made on a direct steam infusion plant. The ingredients were premixed at 70° C., preheated to 80° C., subjected to UHT treatment of 3 secs at 140° C., cooled to 75° C., homogenized at a pressure of 200bar before being cooled to 5° C. and packed in 250 ml tetrabriks. All samples had oil droplet sizes ($D_{3,2}$) of <1 μm.

Creams with the following compostions were prepared:

|  | 1 | 2 | 3 |
|---|---|---|---|
| Coconut oil | 15.0 | 15.0 | 15.0 |
| Sodium caseinate | 1.0 | 1.0 | 1.0 |
| National Frigex (starch modified) | 2.0 | 2.0 | 2.0 |
| Milei Lactalbumen 70 (whey protein) |  | 2.14 |  |
| Soya Protein (ex Loders Croklaan) |  |  | 1.63 |
| Sucrose | 1.1 | 1.1 | 1.1 |
| Glucose syrup (MD 63) | 1.5 | 1.5 | 1.5 |
| Water and flavour to 100% |  |  |  |

A further sample was prepared by post adding 500ppm $Ca^{+2}$ ($CaCl_2$, $2H_2O$) to a sample of 1. The products had the following properties:

|  | 1 | 2 | 3 | 1 + 500 ppm $Ca^{2+}$ |
|---|---|---|---|---|
| Viscosity (CS) | 11.3 | 9.1 | 8.0 | >30.0 |
| % Flocculation |  |  |  |  |
| Deionised water | 0.8 | 0.0 | 4.0 | 96.0 |
| Water + 50 ppm $Ca^{2+}$ | 0 | 0.8 | 4.0 | 98.0 |
| Water + 100 ppm $Ca^{2+}$ | 0 | 97.6 | 96.8 | 98.8 |
| Water + 150 ppm $Ca^{2+}$ | 72 | 98.4 | 99.2 | 98.8 |
| Water + 200 ppm $Ca^{2+}$ | 96 | 99.2 | 99.6 | 98.8 |

We claim:

1. A sterilized, water-continuous fat emulsion comprising:
   1–30 wt. % of a vegetable fat;
   0.1–5 wt. % of a protein compound;
   0–2 wt. % of an emulsifier composition;
   0–10 wt. % of a sweetener;
   0.01–5 wt. % of a thickener composition;
   0.01–2 wt. % of a flavour composition; and
   some up to 1500 ppm. of a multivalent metal emulsified in water, said emulsion displaying a percentage of flocculation at heating for 50 min. at 85° C. of at least 50%.

2. Sterilized, water-continuous emulsion according to claim 1, wherein the protein compound is selected from the group consisting of whey protein, pea protein, coconut protein, soy protein and caseinate.

3. Sterilized, water-continuous fat emulsion according to claim 1 or 2, wherein the protein is a mixture of at least two protein-compounds from the group mentioned in claim 2.

4. Sterilized, water-continuous fat emulsion according to claim 1, wherein the pH of the emulsion is about neutral.

5. Sterilized, water-continuous emulsion according to claim 1, wherein the fat is selected from the group consisted of hardened or unhardened vegetable fats, fractions thereof and mixtures of these fats.

6. Sterilized, water-continuous emulsion according to claim 5, wherein the fat is selected from the group consisting of coconut oil, hardened coconut oil, fractions of hardened coconut oil, palmkernel fat, hardened palmkernel fat, fractions of hardened palmkernel fat, palm oil, hardened palm oil, fractions of palm oil or hardened palm oil, soybean oil, sunflower oil, safflower oil, maize oil, rapeseed oil.

7. Sterilized, water-continuous fat emulsion according to claim 1, wherein the thickener is selected from the group consisting of: a carrageenan, locust bean gum, guar gum, starches,. pectins, gelatins, xanthan gum, alginate, agar, gum acacia, gum tracaganth, gellan gum, and mixtures thereof.

8. Sterilized, water-continuous fat emulsion according to claim 1, wherein the thickener is modified starch.

9. Sterilized, water-continuous emulsion according to claim 1, wherein the droplet size of the fat droplets is less than 5 μm.

10. Sterilized, water-continuous emulsion according to claim 1, wherein the droplet size of the fat droplets is less than 1 μm, if the protein compound is coconut protein.

11. Sterilized, water-continuous emulsion according to claim 1, wherein the emulsion is not whippable.

12. Sterilized, water-continuous fat emulsion according to claim 1 wherein the amount of vegetable fat is 1–15 wt %, the sweetener is a carbohydrate and the pH is 6.5–7.5.

13. A sterilized, water-continuous fat emulsion according to claim 1, wherein the protein comprises caseinate and at least 50 ppm of a multivalent metal is present.

14. A sterilized, water-continuous fat emulsion according to claim 1, wherein the emulsion comprises 10–1500 ppm of a multivalent metal.

15. A sterilized, water-continuous emulsion according to claim 1, wherein the sweetener is selected from the group consisting of sucrose, glucose, fructose, syrups of glucose or fructose, maltodextrins and mixtures thereof.

16. Sterilized, water-continuous emulsion according to claim 15, wherein the sweetener is a mixture of sucrose and a glucose syrup having a weight ration of 1:2 to 2:1.

17. A sterilized, water-continuous emulsion according to claim 1 wherein the Kinematic viscosity of the emulsion at 30° C. ($-\eta_{30}$) ranges from 1–500 c.s.

18. A sterilized, water-continuous emulsion according to claim 1 wherein the emulsion is stable against coalescence for at least a period of 3 months at 35° C.

19. Process for the preparation of a water-continuous fat emulsion according to claim 1 which comprises:
   preparing a premix of all components except the metal component at 50°–80° C.;
   heating the premix to a temperature above 80° C.;
   subjecting the heated premix to a direct or indirect UHT treatment at 130°–150° C. for 1–30 seconds;
   cooling the sterilized mixture to 50°–75° C.;
   homogenizing the cooled, sterilized mixture at a pressure of 10–250 bar;
   cooling the homogenized mixture to 5°–35° C.; and
   aseptically packing the cooled mixture, a sterilized multivalent metal solution being added to the mixture in the above-mentioned process in one of the following steps:
   1) just before homogenization;
   2) just after homogenization;
   3) after the final cooling step to 5°–35° C. but before packaging.

20. Process according to claim 19, wherein part of the cooled emulsion having a temperature of 5°–35° C. is stored in a buffer tank before it is packed.

21. Food products consisting at least partly of the sterilized water-continuous fat emulsion according to claim 1.

22. A sterilized, water-continuous fat emulsion comprising:
   1–30 wt. % of a vegetable fat;
   0.1–5 wt. % of a protein compound;
   0–2 wt. % of an emulsifier composition;
   0–10 wt. % of a sweetener;
   0.01–5 wt. % of a thickener composition;
   0.01–2 wt. % of a flavour composition; and
   10–1500 ppm. of a multivalent metal emulsified in water, said emulsion having a Kinematic viscosity at 30° C. ($=\eta_{30}$) ranging from 2–200 centistokes and displaying a percentage of flocculation at heating for 50 min. at 85° C. of at least 75%.

* * * * *